Figure 1:
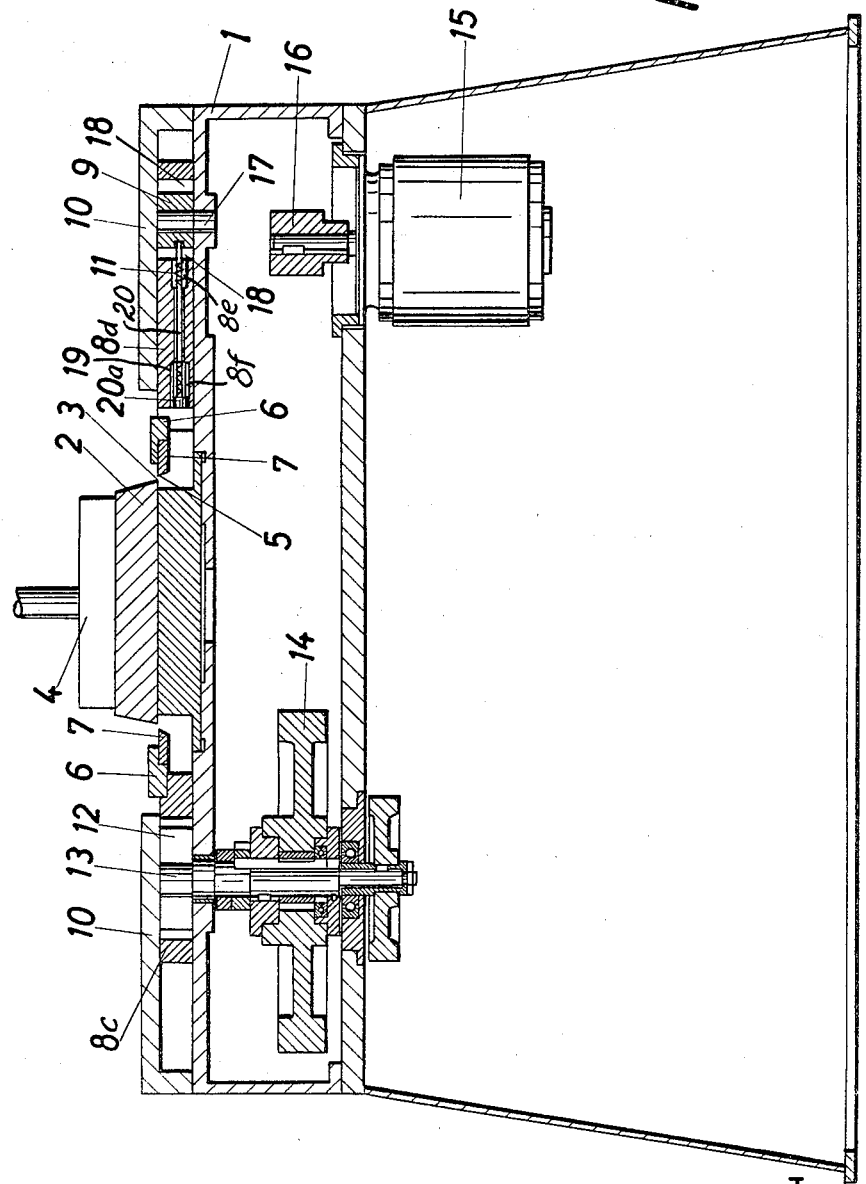

May 21, 1968 R. WIDANI 3,383,966
DEVICE FOR TRIMMING THE EDGES OF HOLLOW BODIES
Filed March 16, 1966 4 Sheets-Sheet 1

INVENTOR.
RUDOLF WIDANI
BY Hans and Hydch
ATTORNEYS

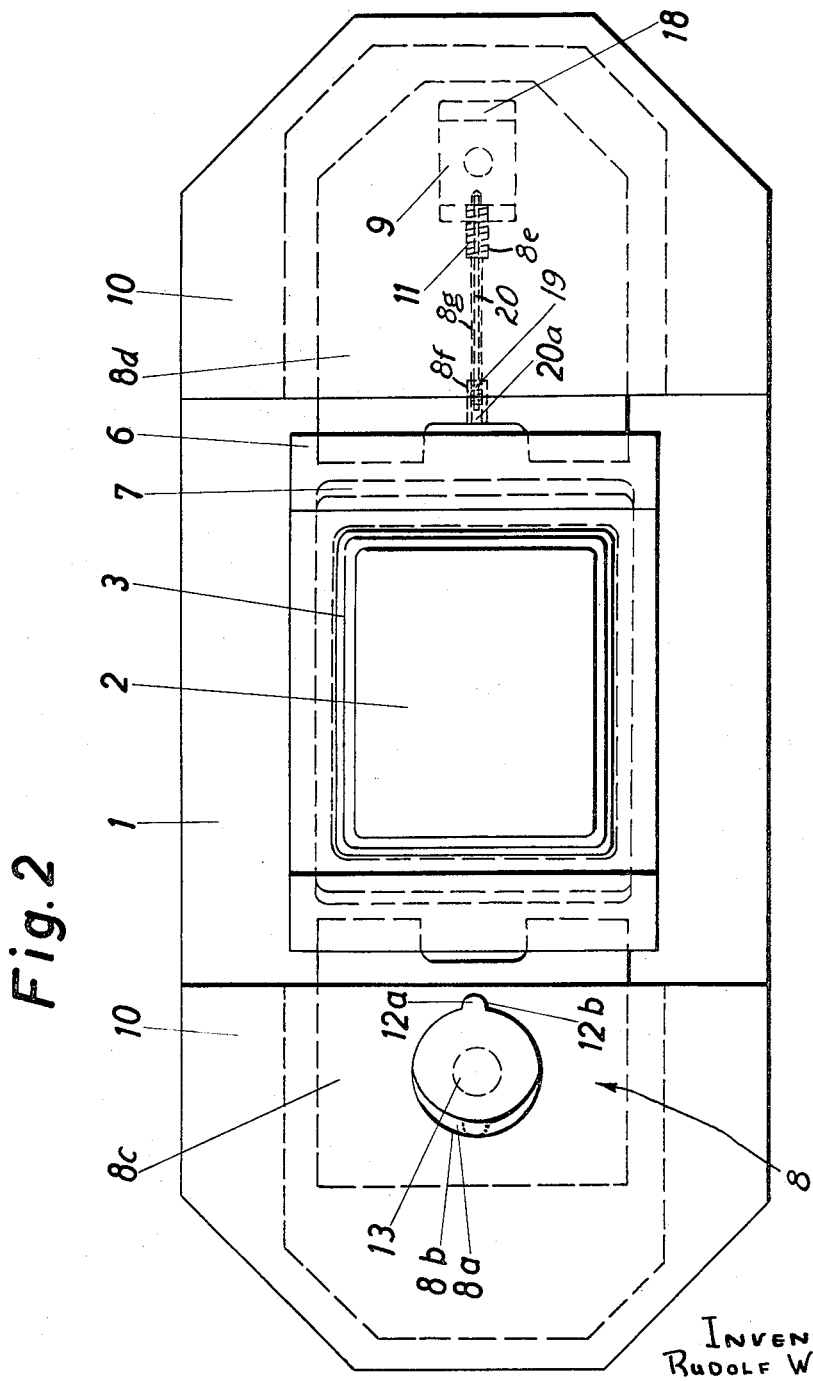

May 21, 1968 R. WIDANI 3,383,966
DEVICE FOR TRIMMING THE EDGES OF HOLLOW BODIES
Filed March 16, 1966 4 Sheets-Sheet 3

INVENTOR.
RUDOLF WIDANI
BY Hame and Nydick
ATTORNEYS

United States Patent Office 3,383,966
Patented May 21, 1968

3,383,966
DEVICE FOR TRIMMING THE EDGES OF HOLLOW BODIES
Rudolf Widani, Nuremberg, Germany, assignor to Ludwig Widani Werkzeugmaschinen, Nuremberg, Germany, a firm of Germany
Filed Mar. 16, 1966, Ser. No. 534,823
Claims priority, application Germany, Mar. 18, 1965, W 38,794
7 Claims. (Cl. 83—185)

This invention relates to a machine for trimming the edges of hollow bodies, in particular of pressed sheet metal parts, having a stationary cutting head constituting a support for the workpiece and a cutting plate surrounding said head and driven by a cam member engaging into an aperture therein, the resetting of the cutting plate into the initial position being effected by means of a spring.

In edge-trimming machines of this kind, in order to achieve a clean-cut edge, it is important to cut the edge by a continuous cut. It is furthermore important to effect the cutting-off of the edge from the outside, so that workpieces of different sizes can be cut, including pieces of small diameter.

A machine satisfying these requirements has been disclosed in German Patent No. 1,119,211. This device has given satisfactory results.

The device according to the German patent comprises two diametrically opposite driving cams. Each of these cams is associated with a gear and care must be taken to ensure a perfectly synchronous working of the two cams which entail a high constructional expenditure. Moreover, the space underneath the table of the device is occupied by the driving means, so that the cutting and ejection of the cut-off rim meets with difficulties, because the devices required to effect these operations cannot be driven from below.

It is a broad object of the invention to provide a novel and improved edge-trimming device of the type described at the outset. The arrangement according to the invention is such, that in the direction of the longitudinal movement of the cutting plate the drive of the cutting plate is located on one side of the cutting head, while diametrically opposite thereto the cutting plate is pivotable about a bearing pin.

In this manner, there is obtained the advantage that now there is only one cam which must be driven and that, since this cam is located on one side of the machine, the space located underneath the table is free to accommodate other devices, for instance those devices which effect the cutting and ejection of the cut-off edges. Moreover, the necessity of having two perfectly synchronously operating drives is eliminated.

The arrangement is advantageously such, that the bearing pin for the pivotal movement of the cutting plate projects into a sliding block, which is displaceable in the cutting plate to the extent of the longitudinal movement of the latter.

The spring for completing the return movement of the cutting plate into the initial position is a compression spring, inserted between the sliding block and the cutting plate. In order to avoid a shock-like return movement, with this compression spring there may be associated a counter-spring as damping element.

It often happens that the workpieces, whose edges are to be trimmed with the machine according to the invention, must be provided in their marginal regions with apertures, recesses, notches or embossments. For this reason, a further feature of the invention consists therein, that the cutting plate can be replaced by a frame carrying tools for producing these apertures, recesses, notches, embossments or the like.

Figures 3, 5:
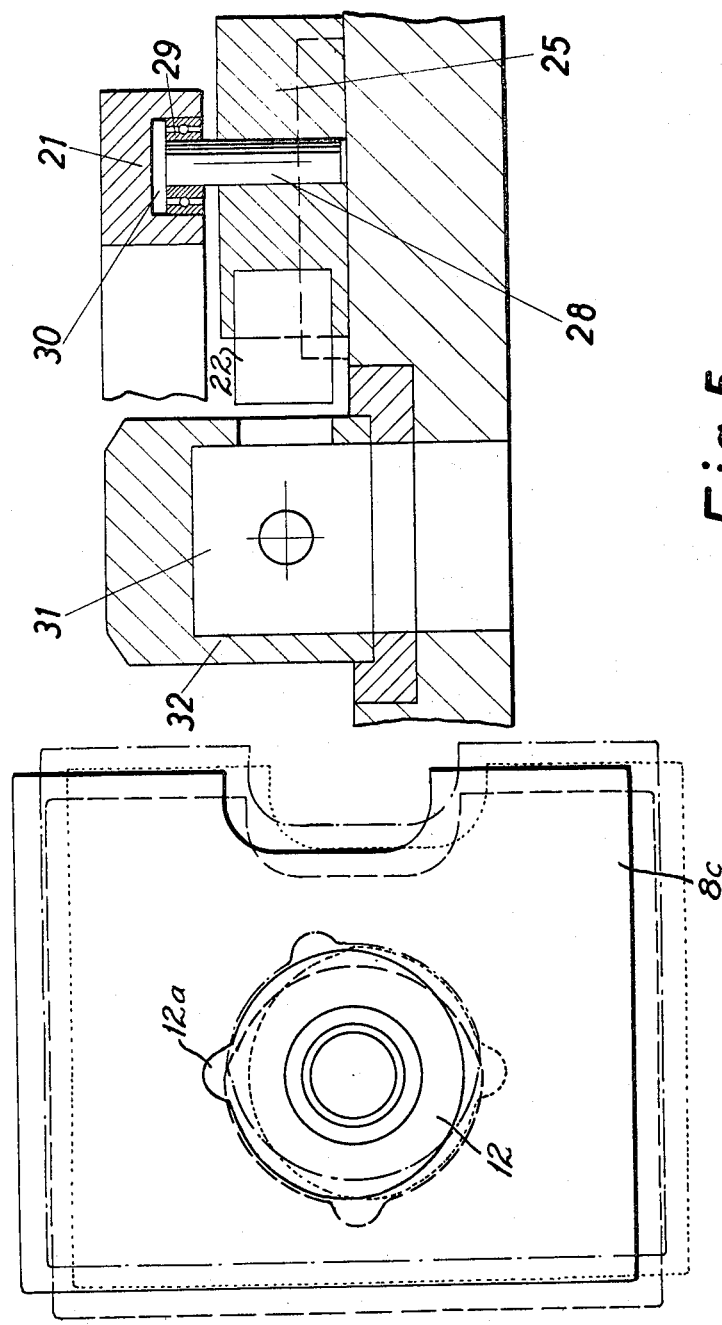
Figure 4:
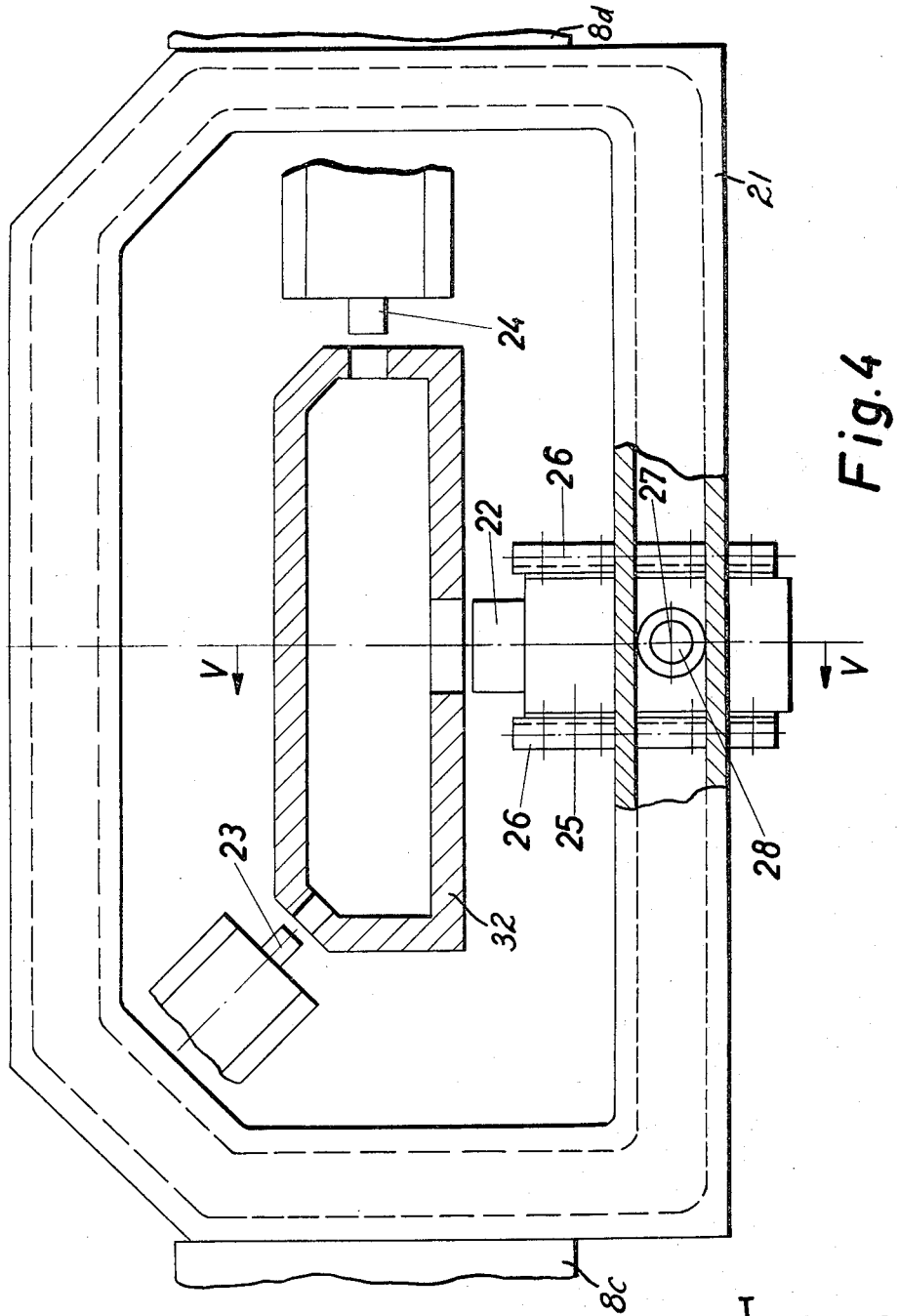

Further advantages and features of the invention will be explained in the description hereinafter given with reference to the accompanying drawing, which schematically illustrates an embodiment and wherein:

FIG. 1 shows a longitudinal section through an edge-trimming machine;
FIG. 2 is a top view of the machine in FIG. 1;
FIG. 3 is a partial top view on an enlarged scale, showing the movement of the cam and of the cutting plate;
FIG. 4 is a top view of the tool-frame which is interchangeable with the cutting plate, and
FIG. 5 is a section along the line V—V in FIG. 4.

A machine table 1 carries a cutting head 2 fastened thereto, on which the workpiece to be worked can be locked into position by means of a pressure plate 4. A cutting edge 3 of the cutting head 2 cooperates with a counter-cutting edge 5 of a knife 7 secured to plate shaped inserts 6. The latter is interchangeably seated in a cutting plate 8. Plate 8 is slidably guided in a guide 10 on frame 1 and has two parts 8c and 8d disposed on opposite sides of cutting head 2 and joined by cutting knife 7 encompassing the cutting head as it is clearly shown in FIG. 2 and secured to the inner edges of the plate parts by means of inserts 6. The plate 8 is reciprocated by means of a cam plate 12, which rotates eccentrically in a cut-out 8a of the plate 8. Plate 12 has a radially projecting nose 12a, which in the initial position engages a correspondingly formed extension 12b of the cut-out 8a in the plate 8.

The cam plate 12 is seated on a shaft 13, which is driven by means of a flywheel plate 14, which may for example be driven by means of a belt (not shown) by the motor 15 over the belt pulley 16.

Cutting plate part 8d is pivotally mounted about a pivot pin 17 diametrically opposite to the cam plate 12. The pin projects into a sliding block 9. The block is displaceable to-and-fro in a recess 18 of plate part 8d (FIG. 2) to the extent of the longitudinal movement of the latter.

When the drive of the cam plate commences to operate, the cam nose 12a is forced out of the extension 12b with the effect, that the cutting plate 8 is displaced, as indicated by broken lines in FIG. 3. During the further rotation of the cam plate, during which the cam nose 12a slides along the inner wall 8b of the cut-out 8a, the nose assumes, as does consequently the cutting plate, the positions drawn in dashed, dotted and chain linked lines in FIG. 3, until it again comes to rest in registry with the extension 12b.

To assure the engagement of cam nose 12a with extension 12 upon completion of the return movement of cutting plate 8 a loaded spring 11 is provided. This spring abuts on one end against the base of a recess 8e of plate part 8d and on the other end against sliding block 9 as is clearly shown in FIGS. 1 and 2. To cushion the impact when nose 12a engages with extension 12b, a damping spring 19 may be provided. This spring is fitted in a recess 8f in cutting plate part 8d. It abuts on one end against the base of this recess and on the other end against a head 20a of a screw bolt 20 extending through a bore in plate part 8d and screwed into sliding block 9 as is clearly shown in FIGS. 1 and 2.

As already mentioned, some hollow bodies must be provided near their edges with apertures, recesses, notches, embossments or the like. In order to avoid the necessity of a separate step for each of such apertures, recesses or the like, the invention further provides that the insert 6 or the cutting plate 8 is interchangeable with a tool carrier, which in FIG. 4 is a frame 21. This frame serves to support the necessary kinds and numbers of tools. In the embodiment illustrated, three reaming tools 22, 23 and 24 are shown for producing perforations of different diameters in a hollow workpiece 32 supported by a carrier 31. The frame 21, when it is substituted for the cutting plate 8 or the insert 6, performs the movements as explained with reference to FIG. 3, that is, it swings about the axis of the bearing pin 17 which is not shown to simplify the illustration. In addition, a holder 25 for each of these tools 22, 23, 24 is guided between rails 26 and is also rotatable about the axis 27. To permit such rotation, a bearing pin 28, is mounted by means of a ball bearing 29 in a recess 30 of the frame 21 and is firmly seated in the tool holder 25.

In this case, the cutting head 2 may be replaced by the carrier 31 for the workpiece 32.

I claim:

1. A trimming device for trimming the edges of a hollow workpiece, said trimming device comprising, in combination, a stationarily mounted cutting head constituting a carrier for the workpiece to be trimmed, a cutting plate encompassing said cutting head, support and guide means supporting said cutting plate movable in its own plane for coaction with the cutting head, a bearing pin supported transversely of said plane and displaceable parallel thereto, said pin engaging a cutting plate part on one side of said cutting head for pivotal movement of the cutting plate about said pin, rotary cam means coacting with a cutting plate part on the opposite side of said cutting head, and drive means coacting with said cam means for rotating the latter to impart to the cutting plate a combined lengthwise and pivotal movement in reference to said cutting head.

2. A trimming device according to claim 1 and comprising a sliding block disposed adjacent to the cutting plate part on said one side of the cutting head and guided by said support and guide means parallel to the plane of the cutting plate, said sliding block supporting said bearing pin.

3. A trimming device according to claim 2 wherein said cam means comprises a circular cut-out having a radial extension in the cutting plate part on the opposite side of the cutting head, and a rotary circular cam plate of lesser diameter than the cut-out and having a radial protrusion in its periphery intermittently engageable with said extension in said respective plate part thereby imparting said combined lengthwise and pivotal movements to the cutting plate.

4. A trimming device according to claim 3 and comprising a loaded spring means urging said extension in the respective plate part into engagement with said cam plate protrusion, said position of engagement constituting a starting position of the device.

5. A trimming device according to claim 4 wherein said spring means is disposed between said sliding block and the cutting plate part on said one side of the cutting head.

6. A trimming device according to claim 5 and comprising a second loaded spring means coacting with said cutting plate part to urge the cutting plate into the direction opposite to the direction of action of the first mentioned spring means to cushion a return movement of the cutting plate into said starting position.

7. A trimming device according to claim 1 wherein said cutting plate is detachably supported on the cutting head and further comprising a tool carrier insertable into said support and guide means instead of the cutting plate for lengthwise movable support of the tool carrier by said means, and support means pivotally supporting the tool carrier to provide for combined lengthwise and pivotal movements thereof in reference to the cutting head by the action of said cam means.

References Cited
UNITED STATES PATENTS

| | | | |
|---|---|---|---|
| 676,156 | 6/1901 | Scharfl | 83—199 |
| 2,526,163 | 10/1950 | Shippy et al. | 83—186 X |
| 3,104,577 | 9/1963 | Callison | 83—185 X |

ANDREW R. JUHASZ, *Primary Examiner.*